United States Patent [19]

Blasius

[11] 4,289,662
[45] * Sep. 15, 1981

[54] METHOD OF MAKING CRUDE BORIC ACID FROM BORATE AND SULFURIC ACID

[75] Inventor: James R. Blasius, Phoenix, Ariz.

[73] Assignee: HJH Chemicals, Inc., Phoenix, Ariz.

[*] Notice: The portion of the term of this patent subsequent to May 29, 1996, has been disclaimed.

[21] Appl. No.: 19,633

[22] Filed: Mar. 12, 1979

Related U.S. Application Data

[63] Continuation-in-part of Ser. No. 892,157, Mar. 31, 1978, Pat. No. 4,156,654.

[51] Int. Cl.$^3$ .................................................. C09K 3/28
[52] U.S. Cl. ...................................... 252/607; 252/62; 423/283; 428/921
[58] Field of Search .................. 252/8.1, 607; 423/283

[56] References Cited

U.S. PATENT DOCUMENTS

| | | | |
|---|---|---|---|
| 1,804,417 | 5/1931 | Herting | 252/8.1 X |
| 1,950,106 | 3/1934 | Franke | 423/283 |
| 2,113,248 | 4/1938 | Berg | 423/283 |
| 2,948,592 | 8/1960 | May | 423/283 |
| 3,650,690 | 3/1972 | Shiloff | 423/283 |
| 3,983,040 | 9/1976 | Draganov | 252/8.1 |
| 4,156,654 | 5/1979 | Blasius | 252/8.1 |
| 4,172,804 | 10/1979 | Christianson et al. | 252/8.1 X |

*Primary Examiner*—Richard D. Lovering
*Attorney, Agent, or Firm*—Merchant, Gould, Smith, Edell, Welter & Schmidt

[57] ABSTRACT

For the conversion of sodium tetraborate (e.g. "5 mole borax" or sodium tetraborate pentahydrate) to a solid, particulate mass of flame-retardant chemical, using little or no water, 0.95 to 0.98 mole of sulfuric acid is added to convert the tetraborate to a moist, particulate mixture of boric acid and sodium sulfate. The moist particulate mixture is suitable for imparting flame retardancy to cellulosic insulation; preferably, however, it is first dried to <20 wt.-% moisture.

10 Claims, No Drawings

METHOD OF MAKING CRUDE BORIC ACID FROM BORATE AND SULFURIC ACID

This application is a continuation-in-part of my co-pending application, Ser. No. 892,157, filed Mar. 31, 1978, now U.S. Pat. No. 4,156,654.

FIELD OF THE INVENTION

This invention relates to a method for converting a sodium tetraborate such as sodium tetraborate pentahydrate to a solid, particulate fire retardant mixture containing boric acid and sodium sulfate. An aspect of this invention involves a method for making a fire retardant mixture suitable for use in the manufacture of flame-retarded cellulose insulation.

DESCRIPTION OF THE PRIOR ART

As a result of increasing cost of energy and dwindling supplies of petroleum, interest in thermal insulation as an energy-saving device has become a matter of government policy. In addition, high volume manufacture of insulation materials has become a top priority matter in most industrialized countries.

One of the most effective types of insulation material is made from some form of cellulose—a particularly inexpensive source of cellulose being scrap newsprint and the like. Cellulose, of course, is flammable, and fire retardant properties are typically imparted to the cellulose by means of treatments with fire retardant chemicals. Boric acid (or boric acid in conjunction with borax) is presently a flame-retarding chemical which is in commercial demand. Reports indicate that the demand, e.g. in the United States may exceed the supply for some years to come. A typical discussion of the demand for increased boric acid output can be found in the article entitled "Boron Chemicals Markets Catch Fire" in *Chemical Week*, June 29, 1977, pages 29 and 30.

It is presently difficult to predict the rate at which boric acid production will grow. There are other uses for boron chemicals besides insulation, and the rate of growth of the insulation market is so abnormally large as to make projections difficult. However, at least for the short term (say over the next few years), any means for improving the efficiency of boric acid production will probably be welcomed by the insulation industry.

Borate-containing ores can be mined by relatively straightforward techniques. Some of these ores contain hydrates of sodium tetraborate in a relatively high state of purity. Commercial processing of these ores can provide sodium tetraborate pentahydrate or the corresponding decahydrate or other stable hydrates in so-called commercial grades exceeding 99% by weight of purity. The abundance and relative degree of purity of sodium tetraborate hydrates has been a great boon to the boron chemicals industry. Sodium tetraborate is easily hydrolyzed with water and acid to form orthoboric acid ($H_3BO_3$), hereinafter referred to as "boric acid". Tetraboric and metaboric acid may also be formed in small quantities during the aforementioned hydrolysis process. These by-products and other by-products which can be considered to be degradation products of boric acid are less preferred by the insulation industry; the prime candidate for fire retardant compositions applied to cellulose is boric acid itself, alone or in admixture with borax (sodium tetraborate decahydrate).

Readily available mineral acids such as sulfuric acid work well in the hydrolysis of sodium tetraborate to boric acid, the principal products of the hydrolysis being $H_3BO_3$ and sodium sulfate. The sulfuric acid/sodium tetraborate reaction has been practiced on a large industrial scale for many years.

Unfortunately, sodium sulfate is of minimal value in a fire retardant composition. Accordingly, the traditional approach to the manufacture of boric acid for insulation purposes has involved the separation of sodium sulfate from the reaction mixture. The sodium sulfate can be sold as a by-product, and the resulting, relatively pure boric acid is an excellent fire retardant chemical. It would nevertheless be advantageous if the conventional step of separating the sodium sulfate from the boric acid could be eliminated.

Furthermore, the conventional practice has involved the use of dilute solutions of sulfuric acid and/or sodium tetraborate, necessitating a very cumbersome drying procedure. Substantial savings could be realized if highly concentrated solutions or the like could be utilized.

The following patents are believed to be representative examples drawn from a body of patent literature disclosing manufacture of boric acid and the use of boric acid or the like in fire retardant compositions:

U.S. Pat. No. 2,113,248 (Berg), issued Apr. 5, 1938;
U.S. Pat. No. 2,948,592 (May), issued Aug. 9, 1960;
U.S. Pat. No. 1,950,106 (Franke), issued Mar. 6, 1934;
U.S. Pat. No. 1,804,417 (Herting), issued May 12, 1931;
U.S. Pat. No. 3,650,690 (Shiloff), issued Mar. 21, 1972.

In relatively recent years, it has been suggested that the step of separating sodium sulfate from boric acid, in a reaction product derived from borate ores by hydrolysis can be eliminated. The resulting impure boric acid-containing mixture is said to be adequate as a fire retarding or flame-retarding composition. See U.S. Pat. No. 3,983,040 (Draganov), issued Sept. 28, 1976. Draganov also suggests that borate ore can be converted to the impure boric acid-containing mixture in a process involving the formation of an aqueous slurry. (That is, Draganov apparently contemplates a hydrolysis technique which does not involve the traditional use of dilute solutions.) In the Draganov process, the acid (e.g. sulfuric acid) is added while the ore is being agitated, and the mixing of the ore and acid is continued while water is being added to the mix. The addition of the water thus takes place during a final mixing stage. Beneficiation of the ore prior to processing is said to be unnecessary, even though the ore (e.g. calcium borate ore) may contain minor amounts of impurities such as limestone.

The applicant has found that, in actual industrial practice, it is extremely difficult to add sulfuric acid directly to a beneficiated material such as a "commercial" grade of a sodium tetraborate hydrate. Local excesses of acid over borate produce poorly controlled results. The heat (exotherm) produced by the reaction of the sulfuric acid and the borate can, if not properly controlled, result in the formation of at least some undesirable by-products such as $HBO_2$, which is less effective in imparting flame-retardant characteristics to cellulose.

SUMMARY OF THE INVENTION

It has now been found that, for the conversion of sodium tetraborate to a solid, particulate flame-retardant mixture containing solid, particulate boric acid and sodium sulfate in a semi-anhydrous process (i.e. without resorting to dilute solutions), it is essential that the amount of sulfuric acid added to the tetraborate fall within a critical range, i.e. about 0.95 to about 0.98 mole of sulfuric acid per mole of sodium tetraborate. If this molar ratio is properly used, quality control over the fire-retardant product can be reasonably adequate, particularly if the sulfuric acid/tetraborate reaction medium contains a slurrying amount of water. A typical slurrying amount of water ranges from about 3 to about 10 moles per mole of sodium tetraborate. Even at elevated temperatures such as 100° C., 10 moles of water will not dissolve all of a sodium tetraborate such as $Na_2B_4O_7.5H_2O$; accordingly, a considerable mass of sodium tetraborate particles will be suspended in the water, thus forming the slurry. (In those uses of boric acid or boric acid/sodium sulfate mixtures wherein a nonuniform boric acid (or mixture) is acceptable, concentrated sulfuric acid can be added to the sodium tetraborate without sufficient water to form a uniform slurry.) Formation of undesirable by-products is reduced by keeping the temperature of the reaction mixture below 175° C. and preferably below 150° C., although temperatures above 100° C. are advantageous in that the water in the slurry will be driven off, leaving behind a particulate or granular, moist residue which is suitable for packaging as a boric acid substitute. Preferably, the packaging is delayed until the product has been dried to a moisture content below about 20% by weight, e.g. 15–18% by weight. This dried, crude product can contain 30 to 40% by weight $B_2O_3$ (essentially as boric acid) and 30 to 40% by weight of sodium sulfate. The method of this invention can be carried out semi-continuously through alternating use of a plurality of mixers (e.g. ribbon blenders).

DETAILED DESCRIPTION

In the description which follows, the raw materials and the method of converting them to a fire-retardant mixture will first be described, followed by a description of the resulting fire retardant mixture itself. Methods for utilizing the fire retardant mixture are known in the art. In essence, the mixture produced by the method of this invention can be substituted for boric acid in the manufacture of Class 1 insulation. The substitution may or may not be on a weight-for-weight basis; most typically, it will require more of the crude boric acid (i.e. the sodium sulfate/boric acid mixture) to equal the performance of boric acid itself, since sodium sulfate is not particularly effective as a fire retardant chemical.

In one typical prior art formula, cellulosic insulation is flame-retardant by treatment with a mixture of one part boric acid with three parts borax. To calculate the equivalent amount of boric acid/sodium sulfate mixture, the bench mark is the boric oxide ($B_2O_3$) content. As noted previously, some of the boric acid may be in the form of $HBO_2$ or other chemicals. Thus, an invariant yardstick for any boric acid-containing composition is the boric acid content.

The properties of boric acid can be influenced by the presence of certain other substances, including chlorides, nitrates, sulfates, and borax. For example, borax raises the solubility of boric acid due to the formation of sodium polyborates. Boric acid itself theoretically contains 56.30% boric oxide and 43.70% water. When heated above 100° C. in the open, boric acid gradually loses water, first changing to metaboric acid ($HBO_2$), of which 3 monotropic forms exist. Dehydration stops at the composition $HBO_2$ unless the time of heating is extended or the temperature raised above 150° C. On continued heating at higher temperatures, all water is removed leaving the anhydrous oxide, $B_2O_3$. Boric acid is stable at ordinary temperatures.

Although a major focus of this application will be directed toward a method for making the aforementioned sodium tetraborate/sodium sulfate mixture, it should be understood that the mixture need not be used as is and can, if desired, be separated into its boric acid and sodium sulfate components. However, insofar as any separation step involves the use of a large volume of water (e.g. separation techniques taking advantage of differences in solubility between the two components), some of the advantages of the aqueous slurry (as opposed to dilute solution) feature of the process will be lost.

The raw materials used in the process will now be discussed in detail.

Sodium Tetraborate

The compound sodium tetraborate occurs in a variety of forms, including a variety of hydrates. Two of the commonest states of hydration (from a commercial availability standpoint) are the pentahydrate, $Na_2B_4O_7.5H_2O$ and the decahydrate, $Na_2B_4O_7.10H_2O$. The term "borax" usually refers to the decahydrate, although the terms "5 mole borax" and "10 mole borax" are sometimes used to denote the pentahydrate and the decahydrate.

The pentahydrate has many advantages over the decahydrate. First, it can be considered to be a more "concentrated" form of sodium tetraborate. Second, it reacts somewhat faster with sulfuric acid in the method of this invention. Third, better quality control can oftentimes be obtained with the pentahydrate. It is particularly worth noting that even the so-called "commercial" grades of the pentahydrate are purer than some laboratory grade chemicals. Technical grade "5 mole" borax typically contains no more than about 0.05% chloride, 0.08% sulfate, and 0.004% iron oxide ($Fe_2O_3$). A purity of 99.85% or better is thus obtainable on a large commercial scale. Obtaining "5 mole borax" of 99% purity or greater is certainly no problem.

When heated in a closed space, sodium tetraborate pentahydrate melts in its own water at temperatures below 200° C. In the open, however, it loses water of crystallization below that temperature without liquefying. With continued heating in the open, and increasing temperatures, dehydration proceeds until anhydrous sodium tetraborate is formed. Published data indicate that, at about 58° or 59° C., the pentahydrate is converted to "kernite", i.e. sodium tetraborate tetrahydrate. Such in situ conversion has no adverse effect upon the practice of this invention. Indeed, kernite can also be used as a starting material in this invention; however, from a commercial standpoint, it is ordinarily easier to use the pentahydrate as the initial starting material. Once dissolved, there is little or no difference between the various hydrates of sodium tetraborate—all produce sodium tetraborate solutions.

The solubility of sodium tetraborate pentahydrate in water is highly temperature dependent. At 0° C., the percent of pentahydrate by weight of saturated solution is reported to be 1.52%. At 20° C., a saturated solution is reported to be 3.6%, and at 25° C., 4.44%. Starting at about 45° C., the solubility of the pentahydrate begins to increase fairly rapidly until it reaches about 50% at 100° C. The boiling point of a saturated solution of the pentahydrate is reported to be 102.8° C., at which temperature the percent of pentahydrate by weight of saturated solution is 53.17%. Thus, there are more than 15 moles of water to every mole of the pentahydrate in a boiling, saturated solution. If one uses less than 15 moles of water per mole of pentahydrate (as is the case in this invention), it follows that at least some of the sodium tetraborate will be suspended in water as undissolved particles. There is no absolute upper limit on the amount of water used to form a slurry of sodium tetraborate according to the teachings of this invention; however, there most certainly is a practical limit. Many of the advantages of this invention will not be obtained if more than 15 moles of water per mole of sodium tetraborate are used to form the reaction medium (exclusive of any water contained in the sulfuric acid added to the reaction medium).

To obtain a reasonably uniform slurry of sodium tetraborate particles in less than 15 moles of water per mole of sodium tetraborate, it is desirable to select a finely divided (e.g. powdered or granular) form of sodium tetraborate (or hydrate thereof). Alternatively, one may screen off oversize particles from a relatively course particulate form. Generally speaking, by "finely divided" is meant particles which pass a 3 U.S. mesh screen, and preferably up to 100% of such particles should pass an 8 mesh screen (U.S.). Fortunately, even the granular form of sodium tetraborate pentahydrate is commercially available in the 100% $-8$ U.S. mesh particle size range. This "5 mole" hydrate is also available in the following particle sizes shown by U.S. Standard Sieve Analysis (according to available trade literature):

| Type | U.S. Standard Sieve No. | Percent (wt.) Cumulative |
| --- | --- | --- |
| "Type B" | +16 | trace |
|  | +200 | at least 90% |
| "Type F" | +70 | 2% maximum |
|  | +200 | at least 50% |
| Powdered | +70 | 8% maximum |

Sulfuric Acid

Commercial grades of sulfuric acid can be used. Advantageously, relatively concentrated grades can be used, including those containing more than 90% sulfuric acid, substantially the balance being water. To provide a slurrying amount of water through the sulfuric acid component, the concentrated sulfuric acid is diluted with water. A disadvantage of this approach is that dilute sulfuric acid is more corrosive than the "concentrated" acid (e.g. 66° Baume, oleum or "fuming" sulfuric acid, 98% and 100% reagent grades, etc.). In accordance with the usual practice followed in the manufacture of boric acid from borax and sulfuric acid, 66° Baume sulfuric acid can be employed, which is reported to have a specific gravity of 1.8354 and to contain 93.19% sulfuric acid. The amount of sulfuric acid used in the method of this invention is believed to be critical and should not exceed about 0.98 moles per mole of sodium tetraborate. The minimum amount of sulfuric acid used should be about 0.95 moles. Optimum results are achieved with 0.95–0.975 moles per mole of sodium tetraborate.

Preferably, the active starting materials used in the process of this invention are only the sodium tetraborate (or hydrate thereof) and the sulfuric acid. As noted previously, some water is preferably introduced into the reaction mixture to provide a generally uniform distribution of the sodium tetraborate through the resulting slurry-like reaction medium. If water is added to the reaction medium, the amount of water will be at least about 3 moles per mole of sodium tetraborate. Distilled and/or deionized water can be used for an extra measure of quality control, but ordinary tap water is suitable in virtually all localities, even in those places where the water is moderately hard or contains iron.

THE METHOD

The method of this invention can be practiced on either a semi-continuous or a batch basis. In the preferred semi-continuous technique, a plurality of reaction zones (e.g. mixing or agitation zones) is employed, so that, for example, one zone can be discharging its moist, fire-retardant product into a drying zone while a new batch of product is in preparation. Through alternating use of the reaction or mixing or agitation zones, which typically would be ribbon blenders or the like, there is always a blender available to receive starting material and always a blender discharging or about to discharge moist product. The practice of this technique is tantamount to continuous production from a continuous starting material stream and is therefore greatly preferred for high-volume production of the boric acid/sodium sulfate mixture.

In the batch technique, a single blender or agitation zone will suffice.

The reaction between sulfuric acid and sodium tetraborate is exothermic. The heat of reaction (exotherm) is useful in this invention, provided that the temperature of the contents of the reaction zone or agitation zone or blender is kept below 175° C., more preferably below 150° C. The apparent $B_2O_3$ content of the product may be unaffected by reaction temperatures above, say, 175° C., but the actual effectiveness of the product may suffer, particularly with respect to its ability to penetrate cellulosic materials. In view of the exothermic nature of the reaction, the reaction zone (which, in the semi-continuous process, would preferably also be the zone in which the sodium tetraborate slurry is formed) need not be heated. Indeed, one preferred practice of this invention is to provide a blending/reaction zone (such as the interior of a ribbon blender) with a cooling means such as a water jacket through which ambient temperature water is circulated. Thus, the aqueous slurry of sodium tetraborate can be formed in the cold, e.g. at ambient indoor or outdoor temperatures. Such ambient temperatures can be near room temperature (20°–25° C.) or lower. Temperatures as low as 0° C. would not result in freezing of a slurry, since the sodium tetraborate will have a freezing point-depressing effect. However, there does not appear to be any advantage to such low temperatures.

In the semi-continuous process utilizing alternating blending zones, the typical practice is to introduce the sodium tetraborate into the zone first, followed by the introduction of the dilute or concentrated acid. Agitation (e.g. with mixing blades or the like) can take place all throughout the process, at least up to the point where the moist, particulate product is discharged to a dryer. (In short, agitation can be continuous, and there does not appear to be any need to start and stop the action of the blender.) As is known in the art, good control over the amounts of raw materials added to a blender can be achieved through manipulation of the addition time. Precise amounts of liquid can be added with a metering pump by controlling the time that the metering pump is operating, i.e. through intermittent operation of the metering device for predetermined times. For solid materials, similar control can be achieved with augurs and/or a gravity feed controlled by intermittent opening and closing of a door in a hopper. In one known technique, a holding bin with a given capacity can be used to measure out reasonably accurate increments of sodium tetraborate.

A "slurrying amount" of water is an amount sufficient to provide a continuous aqueous suspension medium. As noted previously, this amount of water is not sufficient to completely dissolve the sodium tetraborate. When water is present in the reaction mixture, the amount of water is preferably sufficient to provide a reasonably uniform slurry, i.e. a slurry through which undissolved particles of the sodium tetraborate are uniformly distributed. One test for the uniformity of a slurry would involve taking aliquots from different portions of the slurry and measuring the concentration of the sodium tetraborate (dissolved and undissolved). Variations should be minor—e.g. within a few percent by weight.

As noted previously, the sulfuric acid (added in an amount ranging from about 0.95 to about 0.98 moles per mole of sodium tetraborate in the slurry) reacts exothermically with the sodium tetraborate. The reaction exotherm, if properly managed, results in driving off a significant amount of water in the continuous aqueous suspension medium (i.e. the medium formed or in existence at the time of the addition of the sulfuric acid). The driving off of water amounting to more than 10% by weight of the total reaction medium (including water) can be readily achieved in practice; typical water losses can amount to 20 or 30% or even slightly more, depending upon how much water was used to make the slurry initially. As a result of this water loss, the aforementioned continuous aqueous suspension medium becomes discontinuous and is eventually converted to a mere moisture residue on discrete particles of the boric acid/sodium sulfate mixture. These moist but discrete particles generally comprise a free-flowing mass of particles or granules which can be discharged from the blending zone or reaction zone without special or complex removal procedures. In fact, this moist, particulate mass could be a useful item of commerce as is. The residual moisture on the particles can have a caking effect, however, and it is particularly preferred to reduce the moisture content of the particulate product mass to a level below about 20% by weight. Reduction of the moisture content below 15%, however, is ordinarily not necessary for non-caking properties. The non-caking boric acid/sodium sulfate mixture (which normally contains at least 30% by weight $B_2O_3$, generally as boric acid) is suitable for packaging and sale as a fire or flame-retarding chemical.

Drying

The moist but free-flowing product produced by the batch or semi-continuous process can be dried with mildly elevated temperatures, e.g. in a rotary dryer. Suitable air inlet temperatures for the dryer can range from 90° C. to about 150° C., depending upon the time allotted for drying. Efficient drying with minimal formation of undesired by-products can be obtained with an air inlet temperature on the order of 115°–125° C. (roughly 240°–260° F.). It is generally preferred that the product temperature not significantly exceed 100° C. during the drying step; indeed, adequately efficient drying can be obtained at 120° F. (49° C.). It is particularly undesirable to permit the sodium sulfate/boric acid mixture to approach or exceed 150° C., due to the possibility that $HBO_2$ or $NaBO_2$ may be formed.

Screening

A major amount of the moist particles discharged from the blending zone will pass a 3 mesh (U.S.) screen. Oversize particles can be ground or pulverized. A −3 mesh product is commercially useful and saleable. A finer state of subdivision can of course be provided by techniques well known in the art.

EXAMPLES 1–3

These Examples illustrate typical amounts of sodium tetraborate pentahydrate ("5 mole borax"), sulfuric acid, and tap water used in the process of this invention. Molar ratios can be calculated from these amounts in the usual manner, e.g. for Example 2, these ratios are 0.96:3.95:1 ($H_2SO_4$:$H_2O$:"5 mole borax").

| | INGREDIENTS (Parts by Weight) | | |
|---|---|---|---|
| Example | 5 Mole Borax | Tap Water | $H_2SO_4$ (66° Be) |
| 1 | 1.000 | 0.2450 | 0.3500 |
| 2 | 1.000 | 0.2438 | 0.3463 |
| 3 | 1.000 | 0.2450 | 0.3450 |

If a lower quality, nonuniform product is acceptable, the amount of tap water can be reduced below 3 moles/mole of borax—or even totally eliminated.

What is claimed is:

1. A method for making an essentially dry, free-flowing particulate mixture comprising boric acid and sodium sulfate, said method comprising the steps of:
   a. introducing sodium tetraborate into a mixing zone;
   b. introducing 0.95–0.98 mole of sulfuric acid and exothermically reacting said sulfuric acid with said sodium tetraborate to obtain a mixture of sodium sulfate and boric acid;
   c. maintaining the temperature of said mixing zone above 100° C. but below about 150° C. until a generally free-flowing, moist, particulate mixture is obtained.

2. A method according to claim 1 comprising the additional steps of drying the said generally free-flowing, moist, particulate mixture to a moisture content below about 20% by weight and packaging the thus-dried product.

3. A method according to claim 1 wherein said sodium tetraborate is sodium tetraborate pentahydrate.

4. A method for converting sodium tetraborate to a solid, particulate fire retardant mixture containing solid, particulate boric acid and sodium sulfate, said method comprising the steps of:
   (a) diluting about 0.95 to about 0.98 mole of sulfuric acid with a slurrying amount of water, and (b) blending, in a blending zone, the thus-diluted sulfuric acid with each mole of the sodium tetraborate, thereby forming a reaction medium in the blending zone, (c) maintaining the temperature of said reaction medium generally within the range of about 100° to about 175° C., (d) recovering from the blending zone a solid, particulate fire retardant mixture which has been dried by the reaction exotherm of the reaction medium but retains a moisture content in excess of 20% by weight.

5. A method according to claim 4 wherein said fire retardant mixture is dried further, at a product temperature below 100° C., to a moisture content below 20% by weight, the thus-dried mixture containing sodium sulfate and at least 30% by weight $B_2O_3$, generally as boric acid.

6. A method according to claim 4 wherein the said temperature of said reaction medium is maintained by cooling said blending zone.

7. A method according to claim 4 wherein the sodium tetraborate is sodium tetraborate pentahydrate of more than 99 weight-% purity, and said slurrying amount of water is 3 to 10 moles per mole of the sodium tetraborate.

8. A method for converting sodium tetraborate to a solid, particulate fire retardant mixture containing solid, particulate boric acid and sodium sulfate, said method comprising the steps of:

(a) blending, in a blending zone, sufficient concentrated sulfuric acid of at least 90% by weight $H_2SO_4$ content with the sodium tetraborate to provide about 0.95 to about 0.98 mole of sulfuric acid for each mole sodium tetraborate, whereby the amount of water present in said blending zone is not sufficient to form a uniform slurry, (b) maintaining the temperature in said blending zone generally within the range of about 100° to about 175° C., and (c) recovering from the blending zone a generally dry, free-flowing particulate fire-retardant mass containing sodium sulfate and at least 30% by weight $B_2O_3$, generally as boric acid.

9. A method according to claim 8 wherein said temperature is maintained by cooling said blending zone.

10. A method according to claim 8 wherein the sodium tetraborate is sodium tetraborate pentahydrate of more than 99 weight-% purity.

* * * * *